United States Patent
Sun et al.

(10) Patent No.: US 12,271,634 B2
(45) Date of Patent: Apr. 8, 2025

(54) METHOD OF READING OR WRITING DATA, APPARATUS, AND RELATED DEVICE

(71) Applicant: SUZHOU METABRAIN INTELLIGENT TECHNOLOGY CO., LTD., Jiangsu (CN)

(72) Inventors: Xu Sun, Jiangsu (CN); Yulong Zhou, Jiangsu (CN); Meng Yang, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/697,426

(22) PCT Filed: Nov. 28, 2022

(86) PCT No.: PCT/CN2022/134789
§ 371 (c)(1),
(2) Date: Mar. 29, 2024

(87) PCT Pub. No.: WO2023/155531
PCT Pub. Date: Aug. 24, 2023

(65) Prior Publication Data
US 2024/0264778 A1    Aug. 8, 2024

(30) Foreign Application Priority Data
Feb. 18, 2022 (CN) .................. 202210148645.4

(51) Int. Cl.
*G06F 3/06* (2006.01)
(52) U.S. Cl.
CPC .......... *G06F 3/0659* (2013.01); *G06F 3/0604* (2013.01); *G06F 3/0656* (2013.01); *G06F 3/0673* (2013.01)

(58) Field of Classification Search
CPC .... G06F 3/0659; G06F 3/0604; G06F 3/0656; G06F 3/0673
See application file for complete search history.

(56) References Cited

U.S. PATENT DOCUMENTS

| | | | | | |
|---|---|---|---|---|---|
| 4,800,520 A | * | 1/1989 | Iijima | .................. | G07F 7/1008 235/382 |
| 7,124,236 B1 | * | 10/2006 | Tan | ...................... | G06F 12/0853 711/131 |

(Continued)

FOREIGN PATENT DOCUMENTS

| | | |
|---|---|---|
| CN | 104598388 A | 5/2015 |
| CN | 109117088 A | 1/2019 |

(Continued)

OTHER PUBLICATIONS

Chinese Search Report issued for Chinese Patent Application No. 2022101486454 dated Mar. 23, 2022.

(Continued)

*Primary Examiner* — Kenneth M Lo
*Assistant Examiner* — Alexander Vinnitsky
(74) *Attorney, Agent, or Firm* — Merchant & Gould P.C.

(57) ABSTRACT

Provided in the present disclosure is a method of reading or writing data, including: determining read or write data according to a data read or write request; when a cache miss occurs for the read or write data and a data memory provided in the cache does not have an idle storage address, traversing starting from an initial storage address of the data memory; when a storage address having an unread flag is found in the traversing, writing the read or write data to the storage address having the unread flag; and when the storage address having the unread flag is not found in the traversing, writing the read or write data to a previous storage address of the initial storage address. Further provided in the present (Continued)

disclosure are a data read or write apparatus and device, and a computer-readable storage medium, which all have the above beneficial effects.

18 Claims, 2 Drawing Sheets

(56) References Cited

U.S. PATENT DOCUMENTS

| | | | | |
|---|---|---|---|---|
| 11,860,781 B1* | 1/2024 | Raz | ............... | G06F 3/0604 |
| 2009/0113132 A1* | 4/2009 | Cain, III | ............... | G06F 12/127 |
| | | | | 711/133 |
| 2009/0132749 A1* | 5/2009 | Jones | ............... | G06F 12/0846 |
| | | | | 711/213 |
| 2015/0378906 A1* | 12/2015 | Gschwind | ............... | G06F 9/467 |
| | | | | 711/146 |
| 2017/0168957 A1* | 6/2017 | Christidis | ............... | G06F 12/084 |
| 2019/0384718 A1* | 12/2019 | Hansson | ............... | G11C 11/1675 |
| 2022/0068008 A1* | 3/2022 | Livesley | ............... | G06T 1/60 |
| 2023/0246963 A1* | 8/2023 | Kulkarni | ............... | H04L 45/54 |
| | | | | 370/235 |
| 2023/0305968 A1* | 9/2023 | Huggahalli | ............... | G06F 9/30047 |
| 2023/0393988 A1* | 12/2023 | Hikichi | ............... | G06F 12/0895 |

FOREIGN PATENT DOCUMENTS

| | | |
|---|---|---|
| CN | 111580754 A | 8/2020 |
| CN | 112506823 A | 3/2021 |
| CN | 114201120 A | 3/2022 |
| WO | 2023155531 A1 | 8/2023 |

OTHER PUBLICATIONS

Office Action issued for Chinese Patent Application No. 2022101486454 dated Mar. 29, 2022.

International Search Report for International Patent Application No. PCT/CN2022/134789 mailed Jan. 17, 2023.

* cited by examiner

METHOD OF READING OR WRITING DATA, APPARATUS, AND RELATED DEVICE

CROSS-REFERENCE TO RELATED APPLICATION

The present application is a National Stage Filing of the PCT International Application No. PCT/CN2022/134789 filed on Nov. 28, 2022, which claims priority to Chinese Patent Application No. 202210148645.4 filed with the China National Intellectual Property Administration on Feb. 18, 2022 and entitled "Data Read or Write Method and Apparatus, and Related Device", the disclosure of which is hereby incorporated by reference in its entirety.

TECHNICAL FIELD

The present disclosure relates to the technical field of data storage, in particular, to a data read or write method, and further to a method of reading or writing data, apparatus and device, and a computer-readable storage medium.

BACKGROUND

A cache (also referred to as buffer memory or cache memory) is a small-capacity high-speed memory between a Central Processing Unit (CPU) and a main memory, and has a faster access speed than the main memory. As an important technology used for solving the speed mismatch between the CPU and the main memory, the cache may provide instructions and data to the CPU at a high speed, so as to accelerate an execution speed of a program.

When the CPU cannot find required data in the cache, the corresponding data needs to be acquired in the main memory, and replaced in the cache. A replacement mechanism of the cache may generally be divided into the following three categories: (1) replacement based on first-in first-out criteria: (2) random replacement; and (3) a least recently used method or other derivative methods based on cache history information. The first mechanism preferentially replaces the data first written to the cache without considering the actual usage situations of the cache, and the second mechanism performs completely random replacement without considering the actual usage situations of the cache. However, these two mechanisms are low in cache hit rate, which reduces data read or write efficiency to a certain extent. Although the last mechanism has a higher cache hit rate, an implementation process of the mechanism needs to rely on cumbersome information statistics and algorithmic calculation, as well as more complex hardware structure, which also reduces the data read or write efficiency.

Therefore, how to improve the data read or write efficiency while effectively ensuring a higher cache hit rate is an urgent problem to be solved by a person having ordinary skill in the art.

SUMMARY

Embodiments of the present disclosure provide a data read or write method. The data read or write method may improve data read or write efficiency while effectively ensuring a higher cache hit rate. The embodiments of the present disclosure also provide a data read or write apparatus and device, and a computer-readable storage medium, which all have the above beneficial effects.

The embodiments of the present disclosure provide a data read or write method, including the following operations.

Read or write data is determined according to a data read or write request.

When a cache miss occurs for the read or write data and a data memory provided in the cache does not have an idle storage address, traversing is performed starting from an initial storage address of the data memory.

When a storage address having an unread flag is found in the traversing, the read or write data is written to the storage address having the unread flag.

When the storage address having the unread flag is not found in the traversing, the read or write data is written to a previous storage address of the initial storage address.

In some exemplary embodiments, the operation of determining whether the cache hit or the cache miss occurs for the read or write data includes the following operations.

The read or write data is inputted to a Content Addressable Memory (CAM) provided in the cache.

When address information fed back by the CAM according to the read or write data is received, it is determined that the cache hit occurs for the read or write data.

When the address information fed back by the CAM according to the read or write data is not received, it is determined that the cache miss occurs for the read or write data.

In some exemplary embodiments, after it is determined that the cache hit occurs for the read or write data, the method further includes the following operations.

When the read or write data is write data, a one-hot code CAM_B_rd_data is converted into binary information, and the binary information is connected to RAM_B_rd_addr of a B port of DATA_RAM. The CAM_B_rd_data is read data of a B port of the CAM, the RAM_B_rd_addr is a read address of a B port of an RAM, and the data memory includes the RAM.

RAM_B_rd_addr_en is pulled up, and RAM_B_rd_data is read. The RAM_B_rd_addr_en is read enable of the B port of the RAM, and the RAM_B_rd_data is read data of the B port of the RAM.

A corresponding portion in the RAM_B_rd_data is replaced by the write data sent by the CPU, other portions in the RAM_B_rd_data are maintained unchanged, a write flag bit is set to 1, and a read flag bit is set to 0 so as to generate a new signal, the new signal is assigned to a write data RAM_A_wr_data signal of an A port of the DATA_RAM, RAM_A_wr_addr_en is pulled up at the same time, an address of the B port is assigned to the A port, and the write data and the write and read flag bits are written to the DATA_RAM. The RAM_A_wr_data is write data of an A port of the RAM, and the RAM_A_wr_addr_en is write enable of the A port of the RAM.

In some exemplary embodiments, after it is determined that the cache hit occurs for the read or write data, the method further includes the following operations.

When the read or write data is read data, a one-hot code CAM_B_rd_data is converted into binary information, and the binary information is connected to RAM_B_rd_addr of a B port of DATA_RAM. The CAM_B_rd_data is read data of the B port of the CAM, the RAM_B_rd_addr is a read address of a B port of an RAM, and the data memory includes the RAM.

RAM_B_rd_addr_en is pulled up, the RAM_B_rd_data is read, and then the RAM_B_rd_data is returned to a Central Processing Unit (CPU). The RAM_B_rd_addr_en is read enable of the B port of the RAM, and the RAM_B_rd_data is read data of the B port of the RAM.

A read data cache line is maintained unchanged, a write flag bit is set to 1, and a read flag bit is set to 1 so as to generate a new signal, the new signal is assigned to a write data RAM_A_wr_data signal of an A port of the DATA_RAM, RAM_A_wr_addr_en is pulled up at the same time, an address of the B port is assigned to the A port, and the write data and the write and read flag bits are written to the DATA_RAM. The RAM_A_wr_data is write data of an A port of the RAM, and the RAM_A_wr_addr_en is write enable of the A port of the RAM.

In some exemplary embodiments, the operation of inputting the read or write data to the CAM provided in the cache includes the following operations.

Cpu_addr is connected to a read address CAM_B_rd_addr of a B port of the data memory. The Cpu_addr is an instruction execution address of a CPU, and the CAM_B_rd_addr is a read address of the B port of the CAM.

CAM_B_rd_addr_en is pulled up to perform a read operation, and a storage address ram_addr_one_hot of a one-hot code of the read or write data in the data memory is obtained at a CAM_B_rd_data port. The CAM_B_rd_addr_en is read enable of the B port of the CAM.

In some exemplary embodiments, after writing the read or write data into the storage address having the unread flag, or after writing the read or write data into the previous storage address of the initial storage address, the method further includes the following operation.

A storage address of the read or write data in the data memory and a storage address of the read or write data in a main memory are updated together to the CAM.

In some exemplary embodiments, the operation of determining whether the data memory has the idle storage address includes the following operations.

Traversing is performed starting from the initial storage address of the data memory.

When a storage address having an unwritten flag is found in the traversing, it is determined that the data memory has the idle storage address, and the storage address having the unwritten flag is used as the idle storage address.

When the storage address having the unwritten flag is not found in the traversing, it is determined that the data memory does not have the idle storage address.

In some exemplary embodiments, the operation of traversing starting from the initial storage address of the data memory further includes the following operation.

A read or write flag bit is set for each storage address in the data memory. The read or write flag bit includes a read flag bit and a write flag bit, the read flag bit is used for setting a read flag or the unread flag, the write flag bit is used for setting a written flag or the unwritten flag, the read flag is used for indicating that data information stored in the corresponding storage address has been read, the unread flag is used for indicating that the data information stored in the corresponding storage address has not been read since the data information was written, the written flag is used for indicating that the data information is stored at the corresponding storage address, and the unwritten flag is used for indicating that the corresponding storage address is the idle storage address.

In some exemplary embodiments, after writing the read or write data into the storage address having the unread flag, or after writing the read or write data into the previous storage address of the initial storage address, the method further includes the following operation.

A written flag and the unread flag are set for the storage address of the read or write data in the data memory.

In some exemplary embodiments, when the cache hit occurs for the read or write data, the method further includes the following operations.

When the read or write data is read data, a read flag is set for the storage address of the read or write data in the data memory.

When the read or write data is write data, a written flag is set for the storage address of the read or write data in the data memory.

In some exemplary embodiments, the data read or write method further includes the following operation.

When the cache miss occurs for the read or write data, and the data memory has the idle storage address, the read or write data is written to the idle storage address.

In some exemplary embodiments, before writing the read or write data to the idle storage address, the method further includes the following operations.

When the read or write data is write data, 1 is added to data_ram_next_addr. The data_ram_next_addr is a next write address.

The data_ram_next_addr is connected to RAM_B_rd_addr, RAM_B_rd_addr_en is pulled up to perform a read operation, and 1 is added to addr_cnt_rd. The RAM_B_rd_addr is a read address of a B port of an RAM, the data memory includes the RAM, the RAM_B_rd_addr_en is read enable of the B port of the RAM, and the addr_cnt_rd is the number of times for searching a read address.

A value of a write flag bit RAM_B_rd_data[line_size] is determined. The RAM_B_rd_data is read data of the B port of the RAM.

When the value of the write flag bit is 1, the operation of adding 1 to the data_ram_next_addr is executed again.

When the value of the write flag bit is 0, the data_ram_next_addr is determined as the idle storage address in which the read or write data is written.

In some exemplary embodiments, before writing the read or write data to the idle storage address, the method further includes the following operations.

When the read or write data is read data, 1 is added to data_ram_next_addr_rd.

The data_ram_next_addr_rd is connected to RAM_B_rd_addr, RAM_B_rd_addr_en is pulled up to perform a read operation, and 1 is added to addr_cnt_rd. The RAM_B_rd_addr is a read address of a B port of an RAM, the data memory includes the RAM, the RAM_B_rd_addr_en is read enable of the B port of the RAM, and the addr_cnt_rd is the number of times for searching a read address.

A value of a write flag bit RAM_B_rd_data[line_size] is determined. The RAM_B_rd_data is read data of the B port of the RAM.

When the value of the write flag bit is 1, the operation of adding 1 to the data_ram_next_addr_rd is executed again.

When the value of the write flag bit is 0, the data_ram_next_addr_rd is determined as the idle storage address in which the read or write data is written.

In some exemplary embodiments, after writing the read or write data to the idle storage address, the method further includes the following operations.

Write enable and write data at an A port of a CAM are set to 1, and a value is assigned to a write address as follows at the same time:

CAM_A_wr_addr = {Cpu_addr, data_ram_next_addr_one_rd};

data_ram_next_addr_one_rd is a one-hot code address of data_ram_next_addr_rd, and data_ram_next_addr_one_rd=16'b1<<data_ram_next_addr_rd, where a high bit is an address sent by a CPU, a low bit is a one-hot code storing address to be replaced of the read or write data in the CAM, the CAM_A_wr_addr is a write address of an A port of the CAM, and the Cpu_addr is an instruction execution address of the CPU.

In some exemplary embodiments, the operation of traversing starting from the initial storage address of the data memory further includes the following operations.

Whether a cache hit or the cache miss occurs for the read or write data is determined.

When the cache hit occurs for the read or write data, data reading or writing is performed on the cache.

When the cache miss occurs for the read or write data, whether the data memory has an idle address is determined: when the data memory has the idle address, the read or write data is written to the idle address; and when the data memory does not have the idle address, traversing is performed starting from the initial storage address of the data memory, and the storage address having the unread flag is queried. The initial storage address is a preset storage address.

In some exemplary embodiments, the operation of writing the read or write data to the storage address having the unread flag includes the following operations.

When the read or write data is read data, the read data is acquired from a main memory: the read data is written to the storage address having the unread flag.

When the read or write data is write data, the write data is written to the storage address having the unread flag and the main memory.

In some exemplary embodiments, the operation of writing the read or write data to the previous storage address of the initial storage address includes the following operations.

When the read or write data is read data, the read data is acquired from a main memory, and the read data is written to the previous storage address of the initial storage address.

When the read or write data is write data, the write data is written to the previous storage address of the initial storage address and the main memory.

Embodiments of the present disclosure further provide a data read or write apparatus, including a read or write data determination module, a storage address traversing module, a first data writing module, and a second data writing module.

The read or write data determination module is configured to determine read or write data according to a data read or write request.

The storage address traversing module is configured to, when a cache miss occurs for the read or write data and a data memory provided in the cache does not have an idle storage address, perform traversing from an initial storage address of the data memory.

The first data writing module is configured to, when a storage address having an unread flag is found in the traversing, write the read or write data to the storage address having the unread flag.

The second data writing module is configured to, when the storage address having the unread flag is not found in the traversing, write the read or write data to a previous storage address of the initial storage address.

Embodiments of the present disclosure further provide a data read or write device, including a memory and a processor.

The memory is configured to store a computer program.

The processor is configured to execute operations of any one of the data read or write methods described above.

Embodiments of the present disclosure further disclose a computer-readable storage medium. The computer-readable storage medium stores a computer program. Operations of any one of the data read or write methods described above are implemented when the computer program is executed by a processor.

The data read or write method provided in the embodiments of the present disclosure includes: determining the read or write data according to the data read or write request: when the cache miss occurs for the read or write data and the data memory provided in the cache does not have an idle storage address, traversing starting from the initial storage address of the data memory: when the storage address having the unread flag is found in the traversing, writing the read or write data to the storage address having the unread flag; and when the storage address having the unread flag is not found in the traversing, writing the read or write data to the previous storage address of the initial storage address.

By using the technical solutions provided in the embodiments of the present disclosure, the read or write flag bits are set for the data storage addresses of the data memory in the cache in advance, so as to indicate whether the storage data corresponding to the flag has been subjected to the read or write operations, such that, during data reading or writing, traversing may start from the initial storage address of the data memory when the cache miss occurs for the read or write data and the data memory in the cache does not have the idle storage address, until the storage address having the unread flag is found in the traversing, it indicates that the data information stored in the storage address has never been read, and thus a usage rate is relatively low; in this case, the read or write data may be directly written to the storage address having the unread flag. When the storage address having the unread flag cannot be found in the traversing, the read or write data may be directly written to the previous storage address of the initial storage address, that is, the last storage address in the data memory that is traversed, so as to effectively ensure that the read or write data is stored to the cache. It may be seen that data read or write efficiency may be improved while effectively ensuring a higher cache hit rate.

The data read or write apparatus and device, and a computer-readable storage medium provided in the embodiments of the present disclosure all have the above beneficial effects, and are not described herein again.

BRIEF DESCRIPTION OF THE DRAWINGS

To describe technical solutions in the related art and embodiments of the present disclosure clearly, the drawings that need to be used in the description of the related art and the embodiments of the present disclosure are briefly introduced. It is apparent that the following description of the drawings related to the embodiments of the present disclosure is merely a part of the embodiments in the present disclosure. For those having ordinary skill in the art, other drawings may be obtained according to the drawings provided without creative labor, and the other drawings obtained also fall within the scope of protection of the present disclosure.

DETAILED DESCRIPTION OF THE EMBODIMENTS

The embodiments of the present disclosure provide a data read or write method. The data read or write method may improve data read or write efficiency while effectively ensuring a higher cache hit rate. The embodiments of the present disclosure also provide a data read or write apparatus and device, and a computer-readable storage medium, which all have the above beneficial effects.

In order to describe the technical solutions in the embodiments of the present disclosure more clearly and more completely, the technical solutions in the embodiments of the present disclosure described below with reference to the drawings in the embodiments of the present disclosure. It is apparent that the described embodiments are only part of the embodiments of the present disclosure, not all the embodiments. All other embodiments obtained by those having ordinary skill in the art on the basis of the embodiments in the present disclosure without creative work all fall within the scope of protection of the present disclosure.

The embodiments of the present disclosure provide a data read or write method.

Figure 1:
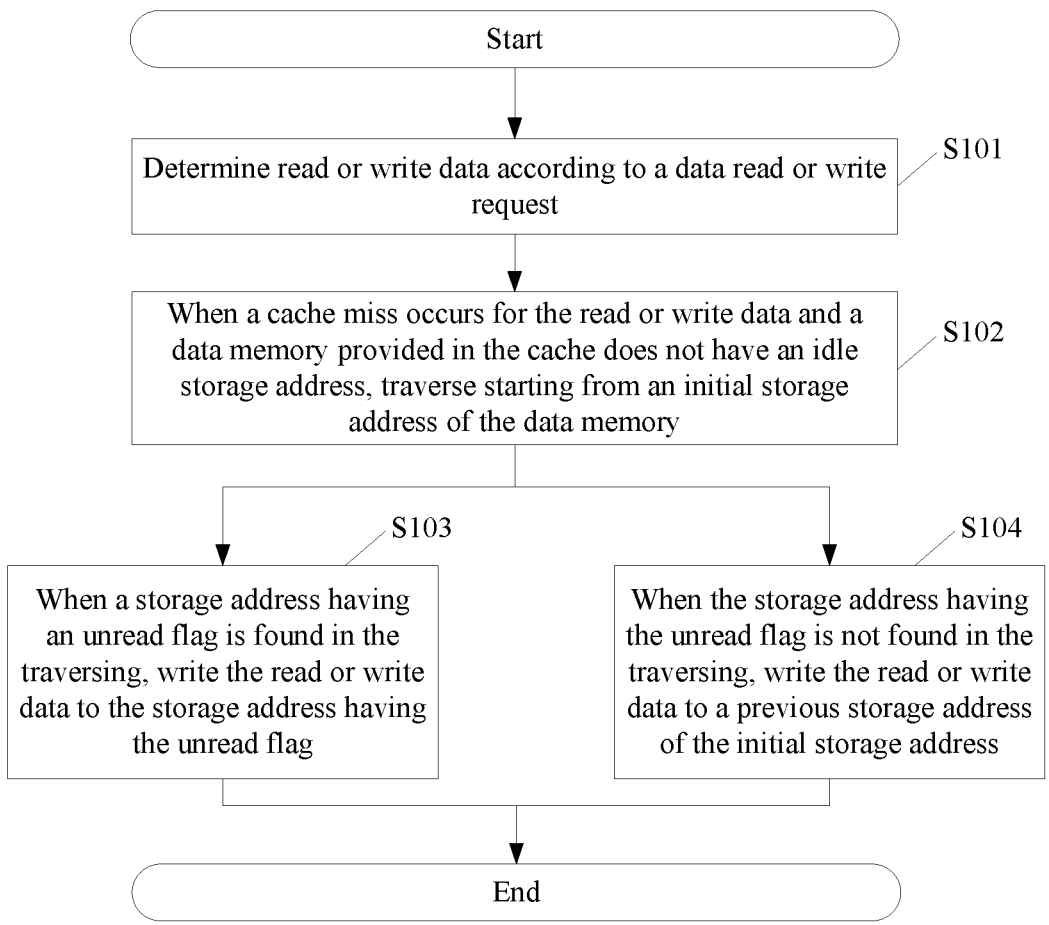
FIG. 1 is a schematic flowchart of a data read or write method according to an embodiment of the present disclosure.

Referring to FIG. 1, FIG. 1 is a schematic flowchart of a data read or write method according to an embodiment of the present disclosure. The data read or write method may include the following operations.

At S101, read or write data is determined according to a data read or write request.

This operation determines the read or write data, i.e., the corresponding read or write data is determined according to the data read or write request. That is to say: when the data read request is received, data information to be read may be determined according to the data read request; and when the data write request is received, data information to be stored may be determined according to the data write request. The data read or write request may be initiated by a technician based on a corresponding front-end device.

At S102, when a cache miss occurs for the read or write data and a data memory provided in the cache does not have an idle storage address, traversing is performed starting from an initial storage address of the data memory.

This operation traverses storage addresses in the data memory, so as to search a storage address having an unread flag. In the cache, the data information may be stored by setting the data memory. The type of the data memory does not affect the implementation of the technical solution, for example, may be implemented by using a Random Access Memory (RAM), and the present disclosure is not limited thereto. Based on this, after the read or write data is determined based on the data read or write request, whether a cache hit or the cache miss occurs for the read or write data is determined first: when the cache hit occurs, data may be directly read from the cache: when the cache miss occurs, whether the data memory has an idle storage address (i.e., the storage address in which no data is stored) may be determined: when the data memory has the idle storage address, the read or write data may be directly written to the idle address, so as to improve a hit rate of reading or writing data at next time; and when the data memory does not have the idle storage address, traversing may start from the initial storage address of the data memory, so as to query and obtain the storage address having the unread flag. The initial storage address is a preset storage address, and may be customized by the technician, and the present disclosure is not limited thereto.

At S103, when a storage address having an unread flag is found in the traversing, the read or write data is written to the storage address having the unread flag.

It may be understood that, when the cache miss occurs for the read or write data and the data memory does not have the idle storage address, if the storage address having the unread flag is found in the traversing, it indicates that the data information stored in the storage address has not been read since the data information was written to the storage address, resulting in low usage rate, such that the read or write data may be used to replace original data stored in the storage address, i.e., the read or write data is directly written to the storage address having the unread flag, therefore, the read or write data is written to the cache to complete the replacement and updating of the cache.

At S104, when the storage address having the unread flag is not found in the traversing, the read or write data is written to a previous storage address of the initial storage address.

It may be understood that, when the cache miss occurs for the read or write data and the data memory does not have the idle storage address, if the storage address having the unread flag is not found in the traversing from the initial storage address to the last storage address, it indicates that the usage rate of all data stored in the data memory is relatively high, in this case, in order to write the read or write data to the cache, original data stored in the last storage address (i.e., the previous storage address of the initial storage address) may be directly replaced by the read or write data, i.e., the read or write data is directly written to the last storage address, such that the read or write data is written to the cache to complete the replacement and updating of the cache.

Since whether the data memory has the storage address having the unread flag may be determined by traversing to the last storage address, such that the read or write data is selected to write to the last storage address of the data memory, and it may be effectively ensured that the read or write data is timely written to the cache, thereby improving write efficiency.

It may be seen that, according to the data read or write method provided in the embodiments of the present disclosure, the read or write flag bits are set for the data storage addresses of the data memory in the cache in advance, so as to indicate whether the storage data corresponding to the flag has been subjected to the read or write operations, such that, during data reading or writing, traversing may start from the initial storage address of the data memory when the cache miss occurs for the read or write data and the data memory in the cache does not have the idle storage address, until the storage address having the unread flag is found in the traversing, it indicates that the data information stored in the storage address has never been read, and thus a usage rate is relatively low, in this case, the read or write data may be directly written to the storage address having the unread flag. When the storage address having the unread flag cannot be found in the traversing, the read or write data may be directly written to the previous storage address of the initial storage address, that is, the last storage address in the data memory that is traversed, so as to effectively ensure that the read or write data is stored to the cache. It may be seen that data read or write efficiency may be improved while effectively ensuring a higher cache hit rate.

In an embodiment of the present disclosure, the operation of determining whether a cache hit or the cache miss occurs for the read or write data may include: inputting the read or write data to a CAM provided in the cache: when address information fed back by the CAM according to the read or write data is received, determining that the cache hit occurs for the read or write data; and when the address information fed back by the CAM according to the read or write data is not received, determining that the cache miss occurs for the read or write data.

The embodiments of the present disclosure provide a cache hit determination method, i.e., determining whether a cache hit or the cache miss occurs for the read or write data. The method may be implemented based on the CAM.

Figure 2:
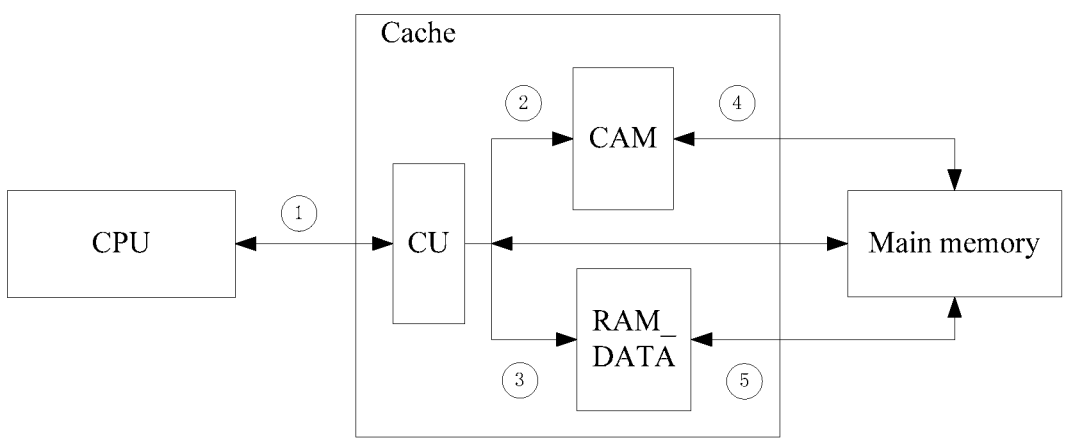
FIG. 2 is a schematic structural diagram of a data read or write system according to an embodiment of the present disclosure.

First referring to FIG. 2, FIG. 2 is a schematic structural diagram of a data read or write system according to an embodiment of the present disclosure. The data read or write system may mainly include a CPU, a cache, and a main memory. The cache mainly includes a Control Unit (CU), a CMA, RAM_DATA (an RAM storing data, i.e., the data memory), etc. The CU mainly completes cache hit determination, cache replacement mechanism control, generation of CAM unit control signals, generation of RAM_DATA unit control signals, etc.; a CAM unit is mainly configured to address data content according to address content; and RAM_DATA is mainly configured to store cache line data. Based on FIG. 2, referring to Table 1, Table 1 is a key signal group description table provided by embodiments of the present disclosure.

being 1 bit and a data depth being 4096 (an address is 0-4095); and the B port is configured with a data bit width being 4 bits and a data depth being 256 (an address is 0-255).

For a write operation, for example, when data "00000111" (i.e., binary 7) is to be written to an address 0010 (i.e., binary 2), a 12-bit address of the A port of the RAM consists of the combination of high 8-bit data "00000111" and low 4-bit data "0100" (one-hot code 2). The write enable and data bit of the A port are both set to 1, and "1" is actually written to a unit of which write address is 074H. When the CAM is written, 8-bit data is not really stored, but a record is made at a storage line corresponding to the 8-bit data.

For a read operation, the read operation is completed at the port B, and the read operation of the CAM is a data matching process actually. (When data is read at the B port, data corresponding to an address 0 is data of addresses 0-3 of the port A, and data corresponding to an address 1 is data of addresses 4-7 of the port A) Retrieved content is connected to an address line (ADDRB) of the port B. When the data has been written to a certain address of the CAM, a corresponding 4-bit matching address is outputted during reading, otherwise, full 0 is outputted. As described in the above example, when data "00000111" (i.e., binary 7) needs to be searched, 7 is connected to the address line (ADDRB) of the port B, and an output value is "0100" (one-hot code 2).

TABLE 1

Key signal group description table

| Signal | Source | Destination | Description |
|---|---|---|---|
| ① | | | |
| CPU_req | CPU | CU | Read or write operation request information of CPU |
| CPU_addr | CPU | CU | Instruction execution address of CPU |
| CPU_type | CPU | CU | Instruction operation type of CPU |
| ②④ | | | |
| CAM_A_wr_addr | CU | CAM | A port write address of CAM |
| CAM_A_wr_addr_en | CU | CAM | A port write enable of CAM |
| CAM_A_wr_data | CU | CAM | A port write data of CAM |
| CAM_B_rd_addr | CU | CAM | B port read address of CAM |
| CAM_B_rd_addr_en | CU | CAM | B port read enable of CAM |
| CAM_B_rd_data | CU | CAM | read data of the B port of CAM |
| ③⑤ | | | |
| RAM_A_wr_addr | CU | RAM_DATA | A port write address of RAM |
| RAM_A_wr_addr_en | CU | RAM_DATA | A port write enable of RAM |
| RAM_A_wr_data | CU | RAM_DATA | A port write data of RAM |
| RAM_B_rd_addr | CU | RAM_DATA | B port read address of RAM |
| RAM_B_rd_addr_en | CU | RAM_DATA | B port read enable of RAM |
| RAM_B_rd_data | CU | RAM_DATA | read data of the B port of RAM |

Different from the RAM, the CAM checks for and outputs corresponding address data according to input data content. When the RAM is used, an input address is used to read all stored data on the address position; and when the CAM is used, the input data is simultaneously compared with data that has been stored in the CAM, and when there is same content, address data stored in the same data is outputted, and a search success signal is searched, otherwise, the search success signal is not outputted. The structure and working principle of the CAM are as follows.

A main part of the CAM is a dual-port random access memory, and two data ports have different bit widths. Using a random memory with a capacity being 4096 bit as an example, the A port may be configured with a data bit width Based on the above explanation, referring to Table 2, Table 2 is a coding mode conversion table provided by embodiments of the present disclosure.

TABLE 2

Coding mode conversion table

| Decimal code | Binary code | One-hot code |
|---|---|---|
| 0 | 4'b0000 | 16'b0000_0000_0000_0001 |
| 1 | 4'b0001 | 16'b0000_0000_0000_0010 |
| 2 | 4'b0010 | 16'b0000_0000_0000_0100 |
| 3 | 4'b0011 | 16'b0000_0000_0000_1000 |
| 4 | 4'b0100 | 16'b0000_0000_0001_0000 |

TABLE 2-continued

Coding mode conversion table

| Decimal code | Binary code | One-hot code |
| --- | --- | --- |
| 5 | 4'b0101 | 16'b0000_0000_0010_0000 |
| ... | | |
| 13 | 4'b1101 | 16'b0010_0000_0000_0000 |
| 14 | 4'b1110 | 16'b0100_0000_0000_0000 |
| 15 | 4'b1111 | 16'b1000_0000_0000_0000 |

During the process of determining whether a cache hit or the cache miss occurs for the read or write data, the read or write data may be inputted to the CAM; and when the CAM queries corresponding address information based on the read or write data, it indicates that the RAM stores the read or write data, i.e., the cache hit occurs for the read or write data: when the CAM cannot query the corresponding address information based on the read or write data, it indicates that the RAM does not store the read or write data, i.e., the cache miss occurs for the read or write data.

In an embodiment of the present disclosure, after the read or write data is written to the storage address having the unread flag, or after the read or write data is written to the previous storage address of the initial storage address, the method may further include: updating a storage address of the read or write data in the data memory and a storage address of the read or write data in a main memory together to the CAM.

The data read or write method provided in the embodiments of the present disclosure realizes the updating of the CAM, so as to effectively ensure the accuracy of a cache hit determination result. After the read or write data is written to the cache, regardless of the storage address having the unread flag or the previous storage address of the initial storage address, the storage address of the read or write data in the data memory and the storage address in the main memory may be updated together to the CAM, so as to perform subsequent new cache hit determination.

In an embodiment of the present disclosure, the operation of determining whether the data memory has the idle storage address may include: traversing starting from the initial storage address of the data memory: when a storage address having an unwritten flag is found in the traversing, determining that the data memory has the idle storage address, and using the storage address having the unwritten flag as the idle storage address; and when the storage address having the unwritten flag is not found in the traversing, determining that the data memory does not have the idle storage address.

Embodiments of the present disclosure provide a method for determining whether the data memory has the idle storage address. The determination method may be implemented according to a read or write flag bit of the storage address. The read or write flag bit may be preset for each storage address, so as to set a read flag, a written flag, an unread flag, and an unwritten flag, and then, after the data information is written to the corresponding storage address, the written flag may be set for the storage address, and it indicates that the storage address has the data information. Based on this, when whether the data memory has the idle storage address is determined, traversing may also start from the initial storage address of the data memory: when the storage address having the unwritten flag is found in the traversing, it indicates that the data memory has the idle storage address, the storage address having the unwritten flag is the idle storage address, and the read or write data may be directly written to the idle storage address, without continuously performing traversing of the storage addresses; and when the storage address having the unwritten flag (equivalent to all storage addresses being written flags) cannot be found in the traversing to the last storage address, it may be determined that the data memory does not have the idle storage address.

In an embodiment of the present disclosure, after the read or write data is written to the storage address having the unread flag, or after the read or write data is written to the previous storage address of the initial storage address, the method may further include: setting a written flag and the unread flag for the storage address of the read or write data in the data memory.

The data read or write method provided in the embodiments of the present disclosure realizes the setting of the read or write flag bit. It may be understood that, in order to effectively ensure the accuracy of an idle storage address determination result, the read or write flag bit of the storage address may be updated in real time. After the read or write data is written to the cache, regardless of the storage address having the unread flag or the previous storage address of the initial storage address, without considering the state of the read or write flag bit of the previous storage address, the written flag and unread flag may both be set for the storage address of the read or write data in the data storage address. The written flag is used for indicating that the current storage position has stored the data information; and the unread flag is used for indicating that the data information stored in the current storage position has not been read since the data information was written.

In an embodiment of the present disclosure, when the cache hit occurs for the read or write data, the method may further include: when the read or write data is read data, setting a read flag for the storage address of the read or write data in the data memory; and when the read or write data is write data, setting a written flag for the storage address of the read or write data in the data memory.

The data read or write method provided in the embodiments of the present disclosure sets the read or write flag bit for different types of data (read data and write data).

For the read data, when cache hit occurs for the read data, the read data may be directly read from the cache without acquiring the read data from the main memory. Based on this, after the read data is read from the cache, the read flag may be set for the storage address of the read data in the data memory, indicating that the data information stored in the storage address has been read. Definitely, when cache miss occurs for the read data, the read data needs to be acquired from the main memory, and the read data is stored into the cache at the same time, in this case, the written flag and unread flag may be set for the storage address of the read data in the data memory.

For the write data, when cache hit occurs for the write data, it indicates that the write data has been stored in the data memory, in this case, the written flag may be set for the storage address of the write data in the data memory, and a read flag bit is set according to read situations. It may be understood that, when cache hit occurs for the write data, it indicates that the write data has been stored in the main memory, and in this case, the write data does not need to be written to the main memory again. Definitely, when cache miss occurs for the write data, the write data may be written to the cache while being stored to the main memory, and after the write data is written to the cache, the written flag and unread flag are set for the storage address of the write data in the data memory.

In an embodiment of the present disclosure, the method may further include: when the cache miss occurs for the read or write data, and the data memory has the idle storage address, writing the read or write data to the idle storage address.

It may be understood that, when the cache miss occurs for the read or write data but the data memory of the cache has the idle storage address, the read or write data may be directly written to the idle storage address, without traversing the storage address to query the storage address that may store the read or write data, such that data read or write efficiency may be effectively ensured.

On the basis of the above embodiments, the embodiments of the present disclosure provide a cache replacement mechanism. The mechanism is implemented as follows.

1. Cache line data and corresponding cache line read or write information are stored to the same address of the RAM; and an address of the cache line in the main memory and address information in the RAM are stored in the CAM.
2. When cache hit occurs for the read operation, the corresponding read flag bit in the RAM is set to 1 (without considering an original state).
3. When cache hit occurs for the write operation, the corresponding write flag bit in the RAM is set to 1 (without considering an original state), and the write data is updated to the main memory.
4. When cache miss occurs for the read operation, the cache line is replaced: data of subsequent RAM addresses and the read or write flag bit are read by adding 1 to an address of an original RAM: when the write flag bit is 0, it indicates that a current storage position is empty, the cache line data read from the main memory is written to the position, the write flag bit is set to 1, and at the same time, the address of the cache line in the main memory and the address information in the RAM are updated in the CAM: when the write flag bit is 1, the address continues to add 1 for jumping, until a next write flag bit being 0) is found: when the entire RAM has completely stored data, i.e., the address has jumped back to a start address, the address is added with 1 again for a round of circular determination: when the read flag bit is 0, it indicates that the data of the cache line has not been read since the data information was written, in this case, the cache line data read from the main memory is written to the current position, and the write flag bit is set to 1; and when the read flag bit is 1, the address continues to add 1 for jumping: when jumping back to the start address, in this case, it means that the read or write flag bits of entire storage space are all 1, a previous address of the start address is used as a replacement address, the cache line data read from the main memory is written to the current position, and the write flag bit is set to 1. Furthermore, while the replacement address is determined, the address of the cache line in the main memory and the address information in the RAM are updated in the CAM.
5. When cache miss occurs for the write operation, the cache line is replaced: data of subsequent RAM addresses and the write flag bit are read by adding 1 to the address of the original RAM: when the write flag bit is 0, it indicates that the current storage position is empty, the written cache line data issued by the CPU is written to the position, the write flag bit is set to 1, and at the same time, the address of the cache line in the main memory and the address information in the RAM are updated in the CAM; and when the write flag bit is 1, the address continues to add 1 for jumping, until a next write flag bit being 0) is found: when the entire RAM has completely stored data, i.e., the address has jumped the entire address space, in this case, the address is jumped back to the previous address of the start address, the written cache line data issued by the CPU is written to the position (covering original data), the write flag bit is set to 1, the address of the cache line in the main memory and the address information in the RAM are updated in the CAM, and the write data is updated to the main memory.

For ease of understanding, an example of an actual scenario is provided for description. Assuming that there is a scenario like this: the size of the cache line is 64 bits, the depth of data RAM (DATA_RAM) is 64 (i.e., 64 pieces of cache line data may be stored), an address bit width depth_size is 4, an address is 0-15, an operation address Cpu_addr_size sent by the CPU end is 16 bits, and an address bit width of the main memory is also 16 bits. The flow of a corresponding read or write operation is as follows.

1. Specifications of a storage unit (CAM and DATA_RAM) are calculated and generated:

(1) DATA_RAM:

The DATA_RAM is used for storing cache line information, and is generally stored and replaced in a unit of cache line in the cache; and the size of the cache line is generally 8, 16, 32, 64, 128 bits, etc., which is represented with line_size. When the DATA_RAM is generated, data bit width of two ports both are line_size+2, where the higher two bits are read or write flag bits, and details may be referred to an attached table 3 (Table 3 is an identification description table in an RAM provided in the present disclosure); and the address bit width may be freely configured according to different actual application scenarios, and is subsequently represented with depth_size. An actual data depth is represented with depth. For example, when a data depth of a memory is 64, i.e., 64 sets of data may be stored, in this case, an address bit width is log 264=6, and 64 addresses may be represented with 6-bit binary numbers.

TABLE 3

Identification description table in RAM

| Bit | Line_size + 1 | Line_size | (line_size − 1):0 |
|---|---|---|---|
| Physical meaning | Read flag bit | Write flag bit | Cache line data |

(2) CAM:

The CAM is mainly configured to store storage address information and flag bit information, the two ports have different data bit widths and address bit widths. Cpu_addr is an operation address (commonly-used such as 8, 16, 32, 64 and other bits), and the data bit width is recorded as Cpu_addr_size. A data bit width of the A port is 1, an address bit width is Cpu_addr_size+depth, an address high bit is a CPU address, and an address low bit is a one-hot code address in the RAM. A data bit width of the B port is depth, and an address bit width is Cpu_addr_size.

2. Data initialization: RAM_A_wr_addr is set to 0, i.e., a default start address.

3. Write cache operation:

The write cache operation comprises two situations of write cache hit and write cache miss. When a system is just initialized, there is no write data in the CPU, in this case, write cache miss occurs; and after the system starts operating for a period of time, the CPU performs a plurality of write operations, partial cache line information has been buffered in the cache, such that, when the write operation is performed again, cache addresses that have been operated before and buffered may be written, in this case, write cache hit occurs, and the data only needs to be written to the corresponding cache, without performing subsequent replacement processing. Definitely, addresses that are not buffered may be written to the cache, and in this case, write cache miss occurs.

(1) Write Cache Hit Determination:

When Cpu_req is 1, i.e., one request is initiated: when cpu_type is a store type of the write operation, Cpu_addr is connected to a read address CAM_B_rd_addr at the B port of a CAM module, CAM_B_rd_addr_en is pulled up to perform the read operation, and the read data (i.e., a one-hot code storage address (ram_addr_one_hot) of the cache line in the data RAM) is obtained at a CAM_B_rd_data port. When CAM_B_rd_data is 0, it is considered as write cache miss; and when the CAM_B_rd_data is not 0, it is considered as the write cache hit.

(2) Write Hit Processing:

The CAM_B_rd_data (one-hot code) in the above operation is converted into binary information, and is connected to RAM_B_rd_addr at the B port of the DATA_RAM, then:

$$RAM\_B\_rd\_addr = \log_2(ram\_addr\_one\_hot);$$

At the same time, RAM_B_rd_addr_en is pulled up, and RAM_B_rd_data is read out. When the DATA_RAM is generated, and a data bit width is the size of the cache line, such that RAM_B_rd_data read each time is information of one cache line, but the write data sent by the CPU may be only a part of content in the cache, thus, the corresponding portion in the RAM_B_rd_data is replaced by the write data sent by the CPU, other portions in the RAM_B_rd_data are maintained unchanged, the write flag bit is set to 1, and the read flag bit is set to 0 so as to generate a new signal, the new signal is assigned to a write data RAM_A_wr_data signal of the A port of the DATA_RAM, RAM_A_wr_addr_en is pulled up at the same time, an address of the B port is assigned to A, i.e., RAM_A_wr_addr==RAM_B_rd_addr, and the data and flag bit are written to the DATA_RAM.

For example, the CPU issues one write operation, and an address is 16'h1000. First, the address is connected to an address line of the B port of the CAM, data 16'b0000_0000_0000_1000 is read, and converted into the binary data 3, then 3 is used as the write address of the A port of the data RAM, and data newly issued by the CPU is written to the space of the address 3 of the RAM.

(3) Write Cache Miss Processing:

a. a next write address (data_ram_next_addr) indicates that, when write cache miss occurs, replacement of a data_ram address is performed; and the number (addr_cnt) of times for searching addresses indicates the number of times for addition of 1 to an address for jumping.

b. A default value after two variables are reset is a start address 0; after write cache miss occurs, 1 is added to data_ram_next_addr (i.e., downward addressing); and the traverse returns to the first address after jumping from the last address, and data_ram_next_addr is connected to RAM_B_rd_addr, RAM_B_rd_addr_en is pulled up to perform the read operation, and 1 is added to addr_cnt.

```
data_ram_next_addr = data_ram_next_addr+1;
RAM_B_rd_addr = data_ram_next_addr;
addr_cnt = addr_cnt+1;
```

Current RAM_B_rd_data[line_size], i.e., the write flag bit, is determined. When the write flag bit is 1, it indicates that the cache line data has been written to the address space, in this case, 1 is added to data_ram_next_addr again, whether a write flag bit of data of a next address is 1 is determined, until an address with the write flag bit being 0 is determined, the current data_ram_next_addr is the replaced write address of the cache line, and zero clearing is performed on addr_cnt.

For example, the address of the current data_ram is 1, write cache miss occurs, data_ram_next_addr addresses downwards, the write flag bit of the address 14 is found to be 0 through the read data, in this case, the address 14 is used as a replacement address of the cache line.

When the write flag bit is always 1, and addr_cnt=$2^{depth\_size}-1$ (for example, the capacity of the data RAM is 16, and addr_cnt is 15), it indicates that the address space of the entire data RAM is traversed, cache line data has been written to the entire space, in this case, data_ram_next_addr is the replaced write address of the cache line, and zero clearing is performed on addr_cnt.

For example, the address of the data_ram of the previous operation is 2, write cache miss occurs, data_ram_next_addr addresses downwards, the write flag bit is found to be 1 through the read data, when addr_cnt==15, and when data_ram_next_addr jumps to the address 1, the address 1 is used as the replacement address of the cache line.

c. The data and flag bits are written to the data RAM.

A write cache line data portion sent by the CPU replaces the corresponding portion, other portions are maintained unchanged, a write flag bit is set to 1, and a read flag bit is set to 0 so as to generate a new signal, the new signal is assigned to a write data RAM_A_wr_data signal of an A port of the DATA_RAM, RAM_A_wr_addr_en is pulled up at the same time, and an address of the B port is assigned to A.

$$RAM\_A\_wr\_addr == RAM\_B\_rd\_addr.$$

d. The replacement address of the cache line is written to the CAM.

Write enable and write data at the A port of the CAM are set to 1, and a value is assigned to the write address as follows at the same time:

```
CAM_A_wr_addr = {Cpu_addr, data_ram_next_addr_one};
data_ram_next_addr_one is a one-hot code address of
data_ram_next_addr.
data_ram_next_addr_one = 16'b1 << data_ram_next_addr;
```

That is, a high bit is an address sent by the CPU, and a low bit is a one-hot code address of the cache line that needs to be replaced and is stored in the RAM.

For example, the CPU issues one write operation, and an address is 16'h1000. When write cache miss occurs, when the replacement address of the cache line obtained through calculation is a binary address 1, the write address of the A port of the CAM is 32'h1000_0002, and write data is 1.

4. Read cache operation:

The read cache operation comprises two situations of read cache hit and read cache miss. When the system is just initialized, there is no write data in the CPU, in this case, read cache miss occurs; and after the system starts operating for a period of time, the CPU performs a plurality of read operations, partial cache line information has been buffered in the cache, such that, when the read operation is performed again, cache addresses that have been operated before and buffered may be read, in this case, write cache hit occurs, and the data only needs to be read out from the corresponding cache and returns to the CPU, without performing subsequent replacement processing. Definitely, data addresses to be read may not be buffered in the cache, and in this case, read cache miss occurs.

(1) Read Cache Hit Determination:

When Cpu_req is 1, i.e., one request is initiated: when cpu_type is a load type of the read operation, Cpu_addr is connected to a read address CAM_B_rd_addr at the B port of a CAM module, CAM_B_rd_addr_en is pulled up to perform the read operation, and the read data (i.e., a one-hot code storage information (ram_addr_one_hot) of the cache line in the data RAM) is obtained at a CAM_B_rd_data port. When CAM_B_rd_data is 0, it is considered as read cache miss; and when the CAM_B_rd_data is not 0, it is considered as read cache hit.

(2) Read Hit Processing:
  a. The CAM_B_rd_data (one-hot code) in the above operation is converted into binary information, and is connected to RAM_B_rd_addr at the B port of the DATA_RAM, then:

```
RAM_B_rd_addr = log2(ram_addr_one_hot);
```

At the same time, RAM_B_rd_addr_en is pulled up, and RAM_B_rd_data is read out and returned back to the CPU.
  b. Data RAM updating: a read data cache line is maintained unchanged, a write flag bit is set to 1, and a read flag bit is set to 1 so as to generate a new signal, the new signal is assigned to a write data RAM_A_wr_data signal of an A port of the DATA_RAM, RAM_A_wr_addr_en is pulled up at the same time, an address of the B port is assigned to A, i.e., RAM_A_wr_addr=RAM_B_rd_addr, and data and flag bits are written to the data RAM.

For example, the CPU issues one read operation, and an address is 16'h1000. First, the address is connected to an address line of the B port of the CAM, data 16'b0000_0000_0000_1000 is read, and converted into the binary data 3, then 3 is used as the read address of the B port of the data RAM, and the cache line data, and read and write flag bits, after being set to 1, are then written to the space of the address 3 of the RAM through the A port of the RAM.

(a) Read Cache Miss Processing:
  a. A next read address (data_ram_next_addr) indicates that, when read cache miss occurs, replacement of a data_ram address is performed; and the number (addr_cnt_rd) of times for searching read addresses indicates the number of times for addition of 1 to an address for jumping.
  b. A default value after two variables are reset is a start address 0; after read cache miss occurs, 1 is added to data_ram_next_addr_rd (i.e., downward addressing); and the traverse returns to the first address after jumping from the last address, and data_ram_next_addr_rd is connected to RAM_B_rd_addr, RAM_B_rd_addr_en is pulled up to perform the read operation, and 1 is added to addr_cnt_rd.

```
data_ram_next_addr_rd = data_ram_next_addr_rd+1;
RAM_B_rd_addr = data_ram_next_addr_rd;
addr_cnt_rd = addr_cnt_rd+1;
```

Current RAM_B_rd_data[line_size], i.e., the write flag bit, is determined. When the write flag bit is 1, it indicates that the cache line data has been written to the address space, in this case, 1 is added to data_ram_next_addr_rd again, whether a write flag bit of data of a next address is 1 is determined, until an address with the write flag bit being 0 is determined, the current data_ram_next_addr_r is the replaced write address of the cache line, and zero clearing is performed on addr_cnt_rd.

For example, the address of the current data_ram is 1, write cache miss occurs, data_ram_next_addr_rd addresses downwards, the write flag bit of the address 14 is found to be 0 through the read data, in this case, the address 14 is used as a replacement address of the cache line.

When the write flag bit is always 1, and addr_cnt=2depth_size−1 (for example, the capacity of the data RAM is 16, and addr_cnt is 15), it indicates that the address space of the entire data RAM is traversed, cache line data has been written to the entire space. In this case, 1 is added to data_ram_next_addr_rd again, i.e., a new round of downward addressing restarts, and the traverse returns to the first address after jumping from the last address, and data_ram_next_addr_rd is connected to RAM_B_rd_addr, RAM_B_rd_addr_en is pulled up to perform the read operation, and 1 is added to addr_cnt_rd.

Current RAM_B_rd_data[line_size+1], i.e., the read flag bit, is determined. When the read flag bit is 1, it indicates that the cache line data has been read from the address space recently, in this case, 1 is added to data_ram_next_addr_rd again, whether a read flag bit of data of a next address is 0 is determined, until an address with the read flag bit being 0 is determined, the current data_ram_next_addr_rd is the replaced address of the cache line, and zero clearing is performed on addr_cnt_rd.

For example, the address of the data_ram of the previous operation is 2, write cache miss occurs, data_ram_next_addr_rd addresses downwards, the write flag bit is found to be always 1 through the read data, and when the read flag bit is at a 14-bit address, the address 14 is used as the replacement address of the cache line.

When the read flag bit is always 1, and addr_cnt=2*2$^{depth\_size}$−1 (for example, the capacity of the data RAM is 16, and addr_cnt is 31), it indicates that the address space of the entire data RAM is traversed for 2 times, cache line data has been written to the entire space, and recent readings have been recorded, in this case, data_ram_next_addr_rd is the replaced write address of the cache line, and zero clearing is performed on addr_cnt_rd.

For example, the address of the data_ram of the previous operation is 2, write cache miss occurs, data_ram_next_addr_rd addresses downwards, the read and write flag bits are found to be always 1 through the read data, when addr_cnt==31, and when data_ram_next_addr_rd jumps to the address 1, the address 1 is used as the replacement address of the cache line.
  c. The data and flag bits returned by the main memory are written to the data RAM.

When read operation miss is sent, the CPU reads corresponding data from the main memory, buffers the returned data in the replaced address space of the data RAM, and then sends the returned data back to the CPU. The cache line data portion returned by the main memory, a write flag bit being set to 1, and a read flag bit being set to 0 are written to the replaced address space of the data RAM together, a newly-generated signal is assigned to a write data RAM_A_wr_data signal of an A port of the DATA_RAM, RAM_A_wr_addr_en is pulled up at the same time, and RAM_A_wr_addr is the above replaced address.

d. The replacement address of the cache line is written to the CAM.

Write enable and write data at the A port of the CAM are set to 1, and a value is assigned to the write address as follows at the same time:

---

CAM_A_wr_addr = {Cpu_addr, data_ram_next_addr_one_rd};
data_ram_next_addr_one_rd is a one-hot code address of data_ram_next_addr_rd.
data_ram_next_addr_one_rd = 16'b1 < < data_ram_next_addr_rd;

---

That is, a high bit is an address sent by the CPU, and a low bit is a one-hot code address of the cache line that needs to be replaced and is stored in the RAM.

For example, the CPU issues one read operation, and an address is 16'h1000. When write cache miss occurs, when the replacement address of the cache line obtained through calculation is a binary address 1, the write address of the A port of the CAM is 32'h1000_0002, and write data is 1.

It may be seen that, according to the data read or write method provided in the embodiments of the present disclosure, the read or write flag bits are set for the data storage addresses of the data memory in the cache in advance, so as to indicate whether the storage data corresponding to the flag has been subjected to the read or write operations, such that, during data reading or writing, traversing may start from the initial storage address of the data memory when the cache miss occurs for the read or write data and the data memory in the cache does not have the idle storage address, until the storage address having the unread flag is found in the traversing, it indicates that the data information stored in the storage address has never been read, and thus a usage rate is relatively low; in this case, the read or write data may be directly written to the storage address having the unread flag. When the storage address having the unread flag cannot be found in the traversing, the read or write data may be directly written to the previous storage address of the initial storage address, that is, the last storage address in the data memory that is traversed, so as to effectively ensure that the read or write data is stored to the cache. It may be seen that data read or write efficiency may be improved while effectively ensuring a higher cache hit rate.

Figure 3:
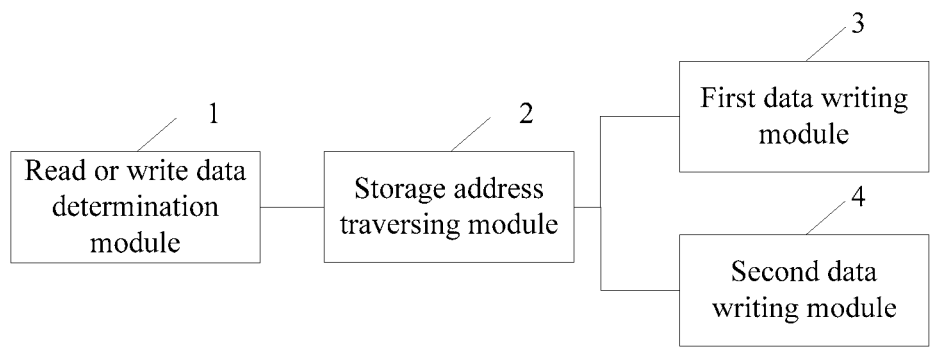
FIG. 3 is a schematic structural diagram of a data read or write apparatus according to an embodiment of the present disclosure.

Examples of the present disclosure further provide a data read or write apparatus. Referring to FIG. 3, FIG. 3 is a schematic structural diagram of a data read or write apparatus according to an embodiment of the present disclosure. The data read or write apparatus may include a read or write data determination module, a storage address traversing module, a first data writing module, and a second data writing module.

The read or write data determination module 1 is configured to determine read or write data according to a data read or write request.

The storage address traversing module 2 is configured to, when a cache miss occurs for the read or write data and a data memory provided in the cache does not have an idle storage address, perform traversing from an initial storage address of the data memory.

The first data writing module 3 is configured to, when a storage address having an unread flag is found in the traversing, write the read or write data to the storage address having the unread flag.

The second data writing module 4 is configured to, when the storage address having the unread flag is not found in the traversing, write the read or write data to a previous storage address of the initial storage address.

It may be seen that, according to the data read or write apparatus provided in the embodiments of the present disclosure, the read or write flag bits are set for the data storage addresses of the data memory in the cache in advance, so as to indicate whether the storage data corresponding to the flag has been subjected to the read or write operations, such that, during data reading or writing, traversing may start from the initial storage address of the data memory when the cache miss occurs for the read or write data and the data memory in the cache does not have the idle storage address, until the storage address having the unread flag is found in the traversing, it indicates that the data information stored in the storage address has never been read, and thus a usage rate is relatively low, in this case, the read or write data may be directly written to the storage address having the unread flag. When the storage address having the unread flag cannot be found in the traversing, the read or write data may be directly written to the previous storage address of the initial storage address, that is, the last storage address in the data memory that is traversed, so as to effectively ensure that the read or write data is stored to the cache. It may be seen that data read or write efficiency may be improved while effectively ensuring a higher cache hit rate.

In an embodiment of the present disclosure, the data read or write apparatus may further include a cache hit determination module, configured to input the read or write data to a CAM provided in the cache: when address information fed back by the CAM according to the read or write data is received, determine that the cache hit occurs for the read or write data; and when the address information fed back by the CAM according to the read or write data is not received, determine that the cache miss occurs for the read or write data.

In an embodiment of the present disclosure, the data read or write apparatus may further include an address information storage module, configured to, after writing the read or write data to the storage address having the unread flag, or after writing the read or write data to the previous storage address of the initial storage address, update a storage address of the read or write data in the data memory and a storage address of the read or write data in a main memory together to the CAM.

In an embodiment of the present disclosure, the data read or write apparatus may further include an idle storage address determination module, configured to: traverse starting from the initial storage address of the data memory: when a storage address having an unwritten flag is found in the traversing, determine that the data memory has the idle storage address, and use the storage address having the unwritten flag as the idle storage address; and when the storage address having the unwritten flag is not found in the traversing, determine that the data memory does not have the idle storage address.

In an embodiment of the present disclosure, the data read or write apparatus may further include a first flag bit setting module, configured to, after writing the read or write data to the storage address having the unread flag, or after writing the read or write data to the previous storage address of the initial storage address, set a written flag and the unread flag for the storage address of the read or write data in the data memory.

In an embodiment of the present disclosure, the data read or write apparatus may further include a second flag bit setting module, configured to: when the cache hit occurs for the read or write data, when the read or write data is read data, set a read flag for the storage address of the read or write data in the data memory; and when the read or write data is write data, set a written flag for the storage address of the read or write data in the data memory.

In an embodiment of the present disclosure, the data read or write apparatus may further include a third data writing module, configured to, when the cache miss occurs for the read or write data, and the data memory has the idle storage address, write the read or write data to the idle storage address.

The introduction of the apparatus provided in the embodiments of the present disclosure refers to the above method embodiments, and details are not described in the embodiments of the present disclosure again.

Figure 4:
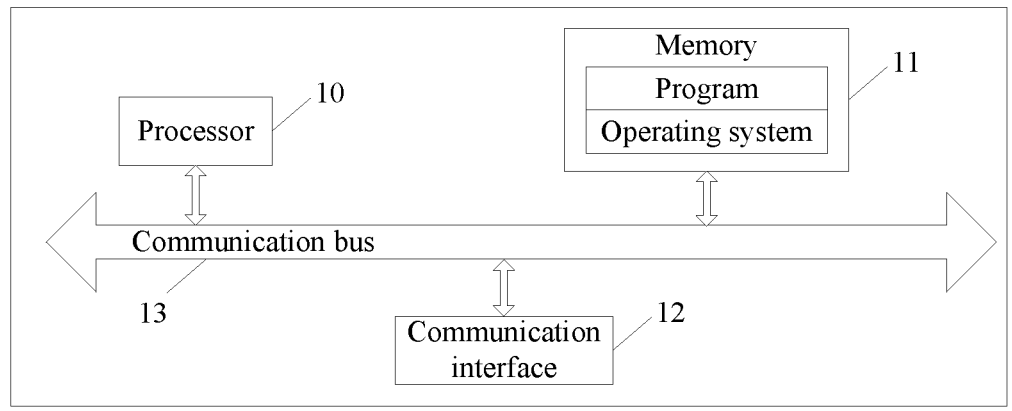
FIG. 4 is a schematic structural diagram of a data read or write device according to an embodiment of the present disclosure.

Examples of the present disclosure further provide a data read or write device. Referring to FIG. 4, FIG. 4 is a schematic structural diagram of a data read or write device according to an embodiment of the present disclosure. The data read or write device may include a memory and a processor.

The memory is configured to store a computer program.

The processor is configured to execute operations of any one of the data read or write methods described above.

FIG. 4 is a schematic diagram of a composition structure of the data read or write device. The data read or write device may include a processor 10, a memory 11, a communication interface 12, and a communication bus 13. The processor 10, the memory 11, and the communication interface 12 all communicate with each other by using the communication bus 13.

In this embodiment of the present disclosure, the processor 10 may be a CPU, an application specific integrated circuit, a digital signal processor, a field programmable gate array, or other programmable logic devices.

The processor 10 may call a program stored in the memory 11. The processor 10 may execute operations in the embodiments of the data read or write method.

The memory 11 is configured to store one or more programs. The program may include a program code. The program code includes a computer operation instruction. In the embodiments of the present disclosure, the memory 11 at least stores the program for implementing the following functions.

Read or write data is determined according to a data read or write request.

When a cache miss occurs for the read or write data and a data memory provided in the cache does not have an idle storage address, traversing is performed starting from an initial storage address of the data memory.

When a storage address having an unread flag is found in the traversing, the read or write data is written to the storage address having the unread flag.

When the storage address having the unread flag is not found in the traversing, the read or write data is written to a previous storage address of the initial storage address.

In a possible implementation, the memory 11 may include a program storage area region and a data storage area. The program storage area may store an operating system, and an application program required for at least one function. The data storage area may store data created during use.

In addition, the memory 11 may include a high-speed random access memory, and may further include a non-volatile memory, for example, at least one disk memory device or other volatile solid state memory devices.

The communication interface 12 may be an interface of a communication module, and is configured to be connected to other devices or systems.

It is apparent that, it is to be noted that, the structure shown in FIG. 4 does not constitute a limitation of the data read or write device in the embodiments of the present disclosure, and in practice the data read or write device may include more or fewer components than those shown in FIG. 4, or a combination of certain components.

The present disclosure further provides a computer-readable storage medium. The computer-readable storage medium stores a computer program. Operations of any one of the data read or write methods described above may be implemented when the computer program is executed by a processor.

The computer-readable storage medium may include: various media capable of storing program codes such as a U disk, a mobile Hard Disk Drive (HDD), a Read-Only Memory (ROM), a Random Access Memory (RAM), a magnetic disk or an optical disk.

The introduction of the computer-readable storage medium provided in the present disclosure refers to the above method embodiments, and details are not described in the present disclosure again.

Each embodiment in this specification is described in a progressive manner, and each embodiment focuses on the differences from other embodiments, and the same or similar parts of each embodiment may be referred to each other. For the apparatus disclosed in the embodiments, since the apparatus corresponds to the method disclosed in the embodiments, the description is relatively simple, and for related parts, refer to the partial descriptions of the method.

The professional may further realize that the units and algorithmic operations of the various examples described in combination with the embodiments disclosed herein are capable of being implemented in electronic hardware, computer software, or a combination of electronic hardware and computer software. In order to clearly illustrate the interchangeability of hardware and software, the composition and the operations of the examples have been described in the above description in general terms according to functions. Whether these functions are executed in a hardware or software manner depends on specific applications and design constraints of the technical solutions. Professionals may realize the described functions for each specific application by use of different methods, but such implementation shall fall within the scope of the present disclosure.

The operations of the method or algorithm described in combination with the embodiments disclosed herein may be implemented directly with the hardware, a software module executed by the processor, or a combination of the hardware and the software module. The software module may be provided in the RAM, the memory, the ROM, the electrically programmable ROM, the electrically erasable programmable ROM, the register, the hard disk, a removable disk, a CD-ROM, or any other form of storage media known in the technical field.

The technical solutions provided in the present disclosure are introduced in detail above. Detailed examples are used in this specification to describe the principles and implementations of the present disclosure. The description of the above examples is merely used to facilitate understanding of the core idea of the present disclosure. It should be noted that for a person having ordinary skill in the art, without departing from the principles of the present disclosure, several improvements and modifications may be made to the present disclosure, which also fall within the scope of protection of the present disclosure.

What is claimed is:

1. A method of reading or writing data, comprising:
determining read or write data according to a data read or write request;
when a cache miss occurs for the read or write data and a data memory provided in the cache does not have an idle storage address, traversing starting from an initial storage address of the data memory;
when a storage address having an unread flag is found in the traversing, writing the read or write data to the storage address having the unread flag; and
when the storage address having the unread flag is not found in the traversing, writing the read or write data to a previous storage address of the initial storage address;
wherein the method further comprises: when the cache miss occurs for the read or write data, and the data memory has the idle storage address, writing the read or write data to the idle storage address;
wherein before writing the read or write data to the idle storage address, the method further comprises: when the read or write data is write data, adding 1 to data_ram_next_addr, wherein the data_ram_next_addr is a next write address; connecting the data_ram_next_addr to RAM_B_rd_addr, pulling up RAM_B_rd_addr_en to perform a read operation, and adding 1 to addr_cnt_rd, wherein the RAM_B_rd_addr is a read address of a B port of an RAM, the data memory comprises the RAM, the RAM_B_rd_addr_en is read enable of the B port of the RAM, and the addr_cnt_rd is the number of times for searching a read address; determining a value of a write flag bit RAM_B_rd_data [line_size], wherein the RAM_B_rd_data is read data of the B port of the RAM; when the value of the write flag bit is 1, executing, again, the operation of adding 1 to the data_ram_next_addr; and when the value of the write flag bit is 0, determining the data_ram_next_addr as the idle storage address in which the read or write data is written.

2. The method according to claim 1, wherein determining whether a cache hit or the cache miss occurs for the read or write data comprises:
inputting the read or write data to a Content Addressable Memory (CAM) provided in the cache;
when address information fed back by the CAM according to the read or write data is received, determining that the cache hit occurs for the read or write data; and
when the address information fed back by the CAM according to the read or write data is not received, determining that the cache miss occurs for the read or write data.

3. The method according to claim 2, wherein after determining that the cache hit occurs for the read or write data, the method further comprises:
when the read or write data is write data, converting a one-hot code CAM_B_rd_data into binary information, and connecting the binary information to RAM_B_rd_addr of a B port of DATA_RAM, wherein the CAM_B_rd_data is read data of a B port of the CAM, the RAM_B_rd_addr is a read address of a B port of an RAM, and the data memory comprises the RAM;
pulling up RAM_B_rd_addr_en, and reading RAM_B_rd_data, wherein the RAM_B_rd_addr_en is read enable of the B port of the RAM, and the RAM_B_rd_data is read data of the B port of the RAM; and
replacing a corresponding portion in the RAM_B_rd_data by the write data sent by the CPU, maintaining other portions in the RAM_B_rd_data unchanged, setting a write flag bit to 1, and setting a read flag bit to 0 to generate a new signal, assigning the new signal to a write data RAM_A_wr_data signal of an A port of the DATA_RAM, pulling up RAM_A_wr_addr_en at the same time, assigning an address of the B port to the A port, and writing the write data and the write and read flag bits to the DATA_RAM, wherein the RAM_A_wr_data is write data of the A port of the RAM, and the RAM_A_wr_addr_en is write enable of the A port of the RAM.

4. The method according to claim 2, wherein after determining that the cache hit occurs for the read or write data, the method further comprises:
when the read or write data is read data, converting a one-hot code CAM_B_rd_data into binary information, and connecting the binary information to RAM_B_rd_addr of a B port of DATA_RAM, wherein the CAM_B_rd_data is read data of a B port of the CAM, the RAM_B_rd_addr is a read address of a B port of an RAM, and the data memory comprises the RAM;
pulling up RAM_B_rd_addr_en, reading the RAM_B_rd_data, and then returning the RAM_B_rd_data to a Central Processing Unit (CPU), wherein the RAM_B_rd_addr_en is read enable of the B port of the RAM, and the RAM_B_rd_data is read data of the B port of the RAM; and
maintaining a read data cache line unchanged, setting a write flag bit to 1, and setting a read flag bit to 1 to generate a new signal, assigning the new signal to a write data RAM_A_wr_data signal of an A port of the DATA_RAM, pulling up RAM_A_wr_addr_en at the same time, assigning an address of the B port to the A port, and writing the write data and the write and read flag bits to the DATA_RAM, wherein the RAM_A_wr_data is write data of the A port of the RAM, and the RAM_A_wr_addr_en is write enable of the A port of the RAM.

5. The method according to claim 2, wherein inputting the read or write data to the CAM provided in the cache comprises:
connecting Cpu_addr to a read address CAM_B_rd_addr of a B port of the data memory, wherein the Cpu_addr is an instruction execution address of a CPU, the CAM_B_rd_addr is a read address of the B port of the CAM; and
pulling up CAM_B_rd_addr_en to perform a read operation, and obtaining, at a CAM_B_rd_data port, a storage address ram_addr_one_hot of a one-hot code of the read or write data in the data memory, wherein the CAM_B_rd_addr_en is read enable of the B port of the CAM.

6. The method according to claim 2, wherein after writing the read or write data to the storage address having the unread flag, or after writing the read or write data to the previous storage address of the initial storage address, the method further comprises:
updating a storage address of the read or write data in the data memory and a storage address of the read or write data in a main memory together to the CAM.

7. The method according to claim 1, wherein determining whether the data memory has the idle storage address comprises:

traversing starting from the initial storage address of the data memory;

when a storage address having an unwritten flag is found in the traversing, determining that the data memory has the idle storage address, and using the storage address having the unwritten flag as the idle storage address; and when the storage address having the unwritten flag is not found in the traversing, determining that the data memory does not have the idle storage address.

8. The method according to claim 7, wherein before traversing starting from the initial storage address of the data memory, the method further comprises:

setting a read or write flag bit for each storage address in the data memory, wherein the read or write flag bit comprises a read flag bit and a write flag bit, the read flag bit is used for setting a read flag or the unread flag, the write flag bit is used for setting a written flag or the unwritten flag, the read flag is used for indicating that data information stored in the corresponding storage address has been read, the unread flag is used for indicating that the data information stored in the corresponding storage address has not been read since the data information was written, the written flag is used for indicating that the data information is stored at the corresponding storage address, and the unwritten flag is used for indicating that the corresponding storage address is the idle storage address.

9. The method according to claim 7, wherein after writing the read or write data to the storage address having the unread flag, or after writing the read or write data to the previous storage address of the initial storage address, the method further comprises:

setting a written flag and the unread flag for the storage address of the read or write data in the data memory.

10. The method according to claim 1, wherein, when the cache hit occurs for the read or write data, the method further comprises:

when the read or write data is read data, setting a read flag for the storage address of the read or write data in the data memory; and when the read or write data is write data, setting a written flag for the storage address of the read or write data in the data memory.

11. The method according to claim 1, wherein before writing the read or write data to the idle storage address, the method further comprises:

when the read or write data is read data, adding 1 to data_ram_next_addr_rd;

connecting the data_ram_next_addr_rd to RAM_B_rd_addr, pulling up RAM_B_rd_addr_en to perform a read operation, and adding 1 to addr_cnt_rd, wherein the RAM_B_rd_addr is a read address of a B port of an RAM, the data memory comprises the RAM, the RAM_B_rd_addr_en is read enable of the B port of the RAM, and the addr_cnt_rd is the number of times for searching a read address;

determining a value of a write flag bit RAM_B_rd_data[line_size], wherein the RAM_B_rd_data is read data of the B port of the RAM;

when the value of the write flag bit is 1, executing, again, the operation of adding 1 to the data_ram_next_addr_rd; and when the value of the write flag bit is 0, determining the data_ram_next_addr_rd as the idle storage address in which the read or write data is written.

12. The method according to claim 1, wherein after writing the read or write data to the idle storage address, the method further comprises:

setting write enable and write data at an A port of a Content Addressable Memory (CAM) to 1, and at the same time assigning a value to a write address as follows:

CAM_A_wr_addr = {Cpu_addr, data_ram_next_addr_one_rd};

data_ram_next_addr_one_rd is a one-hot code address of data_ram_next_addr_rd, and data_ram_next_addr_one_rd=16'b1<<data_ram_next_addr_rd, wherein a high bit is an address sent by a CPU, a low bit is a one-hot code storing address to be replaced of the read or write data in the CAM, the CAM_A_wr_addr is a write address of an A port of the CAM, and the Cpu_addr is an instruction execution address of the CPU.

13. The method according to claim 1, wherein before traversing starting from the initial storage address of the data memory, the method further comprises:

determining whether a cache hit or the cache miss occurs for the read or write data;

when the cache hit occurs for the read or write data, performing data reading or writing on the cache;

when the cache miss occurs for the read or write data, determining whether the data memory has an idle address; when the data memory has the idle address, writing the read or write data to the idle address; and when the data memory does not have the idle address, traversing starting from the initial storage address of the data memory, and querying the storage address having the unread flag, wherein the initial storage address is a preset storage address.

14. The method according to claim 1, wherein writing the read or write data to the storage address having the unread flag comprises:

when the read or write data is read data, acquiring the read data from a main memory, and writing the read data to the storage address having the unread flag; and when the read or write data is write data, writing the write data to the storage address having the unread flag and the main memory.

15. The method according to claim 1, wherein writing the read or write data to the previous storage address of the initial storage address comprises:

when the read or write data is read data, acquiring the read data from a main memory, and writing the read data to the previous storage address of the initial storage address; and when the read or write data is write data, writing the write data to the previous storage address of the initial storage address and the main memory.

16. A device of reading or writing data, comprising:

a memory, configured to store a computer program; and a processor, configured to implement, when executing the computer program, the following operations:

determining read or write data according to a data read or write request;

when a cache miss occurs for the read or write data and a data memory provided in the cache does not have an idle storage address, traversing starting from an initial storage address of the data memory;

when a storage address having an unread flag is found in the traversing, writing the read or write data to the storage address having the unread flag; and when the storage address having the unread flag is not found in the traversing, writing the read or write data to a previous storage address of the initial storage address;

wherein the operations further comprise: when the cache miss occurs for the read or write data, and the data memory has the idle storage address, writing the read or write data to the idle storage address;

wherein before writing the read or write data to the idle storage address, the operations further comprise: when the read or write data is write data, adding 1 to data_ram_next_addr, wherein the data_ram_next_addr is a next write address; connecting the data_ram_next_addr to RAM_B_rd_addr, pulling up RAM_B_rd_addr_en to perform a read operation, and adding 1 to addr_cnt_rd, wherein the RAM_B_rd_addr is a read address of a B port of an RAM, the data memory comprises the RAM, the RAM_B_rd_addr_en is read enable of the B port of the RAM, and the addr_cnt_rd is the number of times for searching a read address; determining a value of a write flag bit RAM_B_rd_data[line_size], wherein the RAM_B_rd_data is read data of the B port of the RAM; when the value of the write flag bit is 1, executing, again, the operation of adding 1 to the data_ram_next_addr; and when the value of the write flag bit is 0, determining the data_ram_next_addr as the idle storage address in which the read or write data is written.

17. A non-transitory computer-readable storage medium, storing a computer program, wherein the following operations are implemented when the computer program is executed by a processor:

determining read or write data according to a data read or write request;

when a cache miss occurs for the read or write data and a data memory provided in the cache does not have an idle storage address, traversing starting from an initial storage address of the data memory;

when a storage address having an unread flag is found in the traversing, writing the read or write data to the storage address having the unread flag; and when the storage address having the unread flag is not found in the traversing, writing the read or write data to a previous storage address of the initial storage address;

wherein the operations further comprise: when the cache miss occurs for the read or write data, and the data memory has the idle storage address, writing the read or write data to the idle storage address;

wherein before writing the read or write data to the idle storage address, the operations further comprise: when the read or write data is write data, adding 1 to data_ram_next_addr, wherein the data_ram_next_addr is a next write address; connecting the data_ram_next_addr to RAM_B_rd_addr, pulling up RAM_B_rd_addr_en to perform a read operation, and adding 1 to addr_cnt_rd, wherein the RAM_B_rd_addr is a read address of a B port of an RAM, the data memory comprises the RAM, the RAM_B_rd_addr_en is read enable of the B port of the RAM, and the addr_cnt_rd is the number of times for searching a read address; determining a value of a write flag bit RAM_B_rd_data[line_size], wherein the RAM_B_rd_data is read data of the B port of the RAM; when the value of the write flag bit is 1, executing, again, the operation of adding 1 to the data_ram_next_addr; and when the value of the write flag bit is 0, determining the data_ram_next_addr as the idle storage address in which the read or write data is written.

18. The method according to claim 11, wherein when the write flag bit is always 1 in the traversing, the method further comprising:

adding 1 to the data_ram_next_addr_rd to restart a round of downward addressing, connecting the data_ram_next_addr_rd to the RAM_B_rd_addr, pulling up the RAM_B_rd_addr_en to perform the read operation, and adding 1 to the addr_cnt_rd;

determining a value of a read flag bit RAM_B_rd_data[line_size+1], when the value of the read flag bit is 1, adding 1 to the data_ram_next_addr_rd again, determining whether the value of the read flag bit of data of a next address is 0, until an address with the read flag bit being 0 is determined, and determining the current data_ram_next_addr_rd as the storage address having the unread flag.

* * * * *